United States Patent
Fyffe et al.

(10) Patent No.: US 12,437,470 B1
(45) Date of Patent: Oct. 7, 2025

(54) NEURAL SHADING

(71) Applicants: Graham L. Fyffe, Culver City, CA (US); Andrew P. Mason, Cottesloe (AU)

(72) Inventors: Graham L. Fyffe, Culver City, CA (US); Andrew P. Mason, Cottesloe (AU)

(73) Assignee: Apple Inc., Cupertino, CA (US)

( * ) Notice: Subject to any disclaimer, the term of this patent is extended or adjusted under 35 U.S.C. 154(b) by 407 days.

(21) Appl. No.: 17/811,130

(22) Filed: Jul. 7, 2022

Related U.S. Application Data

(60) Provisional application No. 63/219,171, filed on Jul. 7, 2021.

(51) Int. Cl.
*G06T 15/80* (2011.01)
*G06T 7/40* (2017.01)
*G06T 15/04* (2011.01)

(52) U.S. Cl.
CPC ............. *G06T 15/80* (2013.01); *G06T 7/40* (2013.01); *G06T 15/04* (2013.01); *G06T 2207/20081* (2013.01); *G06T 2207/20084* (2013.01)

(58) Field of Classification Search
CPC .... G06V 10/82; G06V 40/171; G06V 40/172; G06V 40/174; G06V 40/166; G06V 10/764; G06V 40/176; G06V 40/168; G06V 10/60; G06V 40/161; G06V 40/16; G06V 20/50; G06T 2207/20081; G06T 2207/20084; G06T 17/00; G06T 13/40; G06T 2207/30201; G06T 15/04; G06T 17/20; G06T 15/506; G06T 2207/10016; G06T 5/60; G06T 11/001; G06T 15/80; G06T 7/40; G06T 2215/16; G06T 2200/08; G06T 15/205
See application file for complete search history.

(56) References Cited

U.S. PATENT DOCUMENTS

| | | | |
|---|---|---|---|
| 2022/0237843 A1* | 7/2022 | Saragih | G06T 15/506 |
| 2022/0284663 A1* | 9/2022 | Ha | G06T 19/20 |
| 2023/0343010 A1* | 10/2023 | Kwatra | G06T 13/40 |

* cited by examiner

Primary Examiner — Xiao M Wu
Assistant Examiner — Scott E Sonners
(74) Attorney, Agent, or Firm — Blank Rome LLP

(57) ABSTRACT

Rendering an avatar for a user in a communication session includes obtaining one or more identity textures for the user for the session and obtaining, throughout the session, shading latents for the user. The shading latents are derived from lighting and other information and are utilized as input into a decoder to obtain one or more neural maps. A target texture is generated by warping the identity textures based on the neural maps. The target texture is used for rendering the avatar.

20 Claims, 8 Drawing Sheets

NEURAL SHADING

BACKGROUND

Computerized characters that represent and are controlled by users are commonly referred to as avatars. Avatars may take a wide variety of forms, including virtual humans, animals, and plant life. Some computer products include avatars with facial expressions that are driven by a user's facial expressions. One use of facially based avatars is in communication, where a camera and microphone in a first device transmits audio and a real-time 2D or 3D avatar of a first user to one or more second users such as other mobile devices, desktop computers, videoconferencing systems and the like. Known existing systems tend to be computationally intensive, requiring high-performance general and graphics processors, and generally do not work well on mobile devices such as smartphones or computing tablets. Further, existing avatar systems do not generally provide the ability to communicate nuanced facial representations or emotional states in realistic lighting.

DETAILED DESCRIPTION

Figure 1:
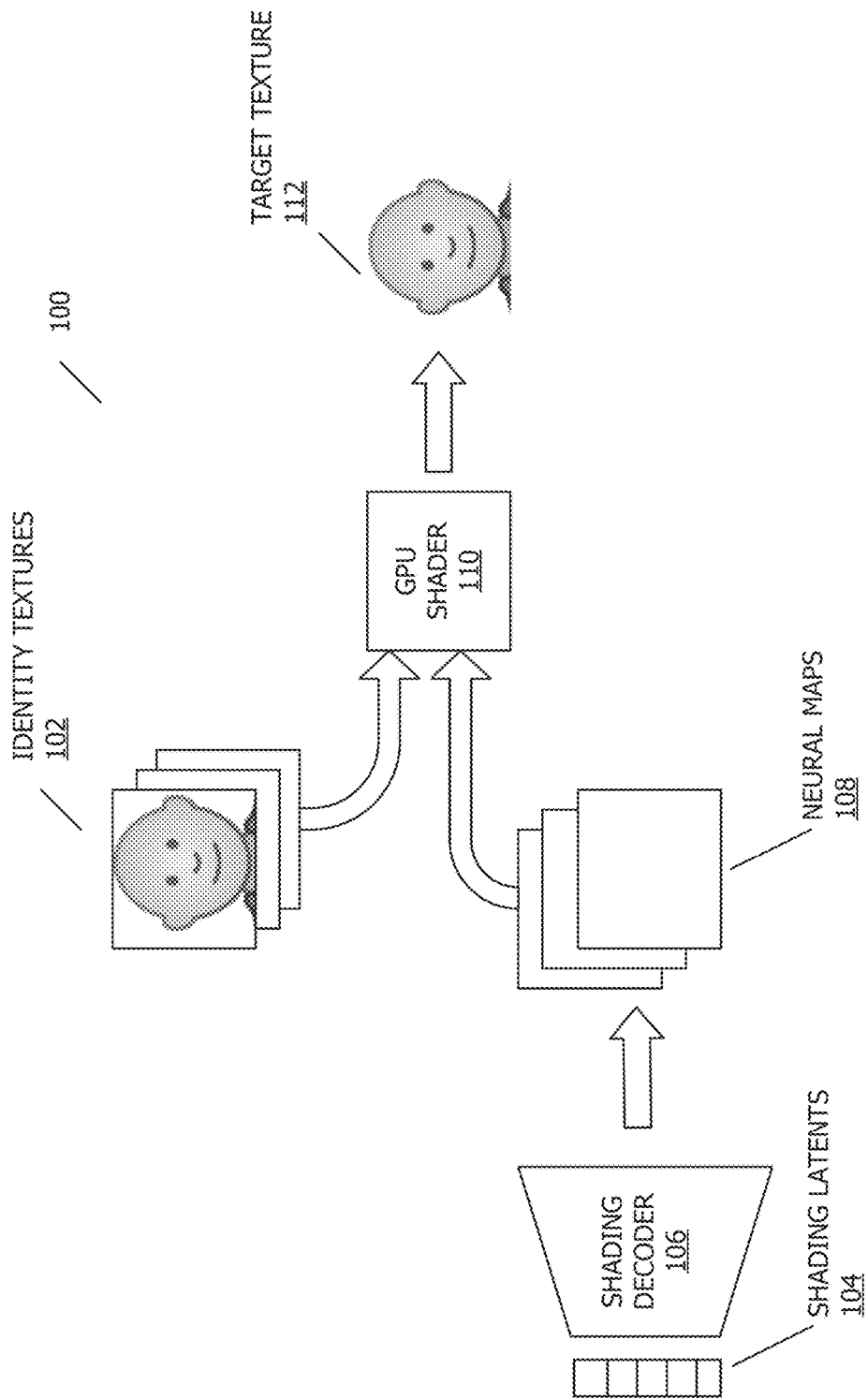
FIG. 1 shows a simplified flow diagram for generating a target texture, according to one or more embodiments.

This disclosure relates generally to image processing. More particularly, but not by way of limitation, this disclosure relates to techniques and systems for generating and utilizing machine learning for rendering an avatar with improved shading.

This disclosure pertains to systems, methods, and computer-readable media to utilize a machine learning-based shading techniques for generating an avatar. To generate a photorealistic avatar, a texture for a face may be generated based on textures specific to a particular user. In one or more embodiments, an image-based communication session may be initiated between a local device and a remote device, where the remote device is associated with a user. One or more identity textures are obtained for the user and, for each of a series of frames in the communication session, a set of shading latents are obtained which represent the lighting of the image. For each of the series of frames, the set of shading latents may be applied to a shading decoder which is configured to produce a set of neural maps, and those neural maps are used with the identity maps to generate a texture for each frame. The generated texture is then used as part of a rendering technique to generate an avatar representation of the remote user at the remote device.

The first phase involves training a shading encoder and a shading decoder based on image data with faces lit under known lighting. In one or more embodiments, environment image data, expression data and head pose and camera angle may be considered. In one or more embodiments, synthetic images may be used in which people or objects are lit under various conditions, and/or real images may be used in which subjects are lit under known or predetermined lighting. In addition, the shading encoder and/or shading decoder may utilize expression parameters, for example, from a trained expression autoencoder which is configured to reduce a particular expression to a set of expression latents which represent the geometry of an expressive face as it differs from a neutral face. Further, in one or more embodiments, the shading encoder and/or shading decoder may also consider identity values which may indicate a uniqueness of an individual, such as how a particular expression uniquely affects a texture of the face or other characteristics of the face.

The second phase involves utilizing the trained networks to generate an avatar or other virtual representation of an object. During a communication session, for example, a first device may transmit one or more identity textures of the user of the first device. The first device may utilize the shading encoder to obtain a set of shading latents. The first device may transmit the shading latents to a second device in the communication session. The second device may utilize a shading decoder to input the shading latents and obtain neural maps throughout the communication session. The second device may obtain from the decoder portion one or more neural maps which can be combined with the identity textures to obtain a target texture. The avatar may be generated, for example, using a multipass rendering technique in which the target texture map is rendered as an additional pass during the multipass rendering process. As another example, the target texture may be overlaid on a 3D mesh for a subject based on the target texture map.

For purposes of this disclosure, an autoencoder refers to a type of artificial neural network used to fit data in an unsupervised manner. The aim of an autoencoder is to learn a representation for a set of data in an optimized form. An autoencoder is designed to reproduce its input values as outputs, while passing through an information bottleneck that allows the dataset to be described by a set of latent variables. The set of latent variables are a condensed representation of the input content, from which the output content may be generated by the decoder. A trained autoencoder will have an encoder portion, a decoder portion, and the latent variables represent the optimized representation of the data.

For purposes of this disclosure, an "encoder" refers to a type of neural network which is configured to take in data and produce a set of data in an optimized form, for example as a set of latent variables. The encoder may or may not be part of an autoencoder, or trained as part of an autoencoder, according to various embodiments.

For purposes of this disclosure, a "decoder" refers to a type of neural network which is configured to take in a compact representation of data, for example in the form of latent variables, and produce content represented by the compact representation. The decoder may or may not be part of an autoencoder, or trained as part of an autoencoder, according to various embodiments.

For purposes of this disclosure, the term "avatar" refers to the virtual representation of a real-world subject, such as a person, animal, plant, object, and the like. The real-world subject may have a static shape or may have a shape that changes in response to movement or stimuli.

A physical environment refers to a physical world that people can sense and/or interact with without aid of electronic devices. The physical environment may include physical features such as a physical surface or a physical object. For example, the physical environment may correspond to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (similar to contact lenses), headphones/earphones, speaker arrays, input systems (e.g., wearable or handheld controllers with or without haptic feedback), smartphones, tablets).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints), and these goals may vary from one implementation to another. It will also be appreciated that such development efforts might be complex and time-consuming but would nevertheless be a routine undertaking for those of ordinary skill in the design and implementation of graphics modeling systems, having the benefit of this disclosure.

Referring to FIG. 1, a flow diagram is presented in which a target texture is generated for rendering an avatar. The flow diagram 100 includes shading latents 104 being input to a shading decoder 106 to obtain a set of neural maps 108. The shading decoder may be trained as part of a shading autoencoder, or may be trained separately to produce neural maps 108 from a set of shading latents 104. The shading latents 104 may be representative of a particular expression, lighting, and/or pose of a face. The generated neural maps 108 may refer to low resolution neural maps related to lighting. The neural maps 108 may include, for example, a neural displacement map, a neural ambient map, a neural diffuse map, a neural specular map, a neural shadow map, and the like.

The face may be associated with identity textures 102, which may be specific to how lighting interacts with the details of the face. As such, identity textures 102 may include, for example, pseudo normals, a diffuse albedo texture map, and a specular albedo map. GPU shader 110 may utilize the neural maps 108 to generate the target texture 112. In one or more embodiments, the identity textures 102 may remain consistent throughout the communication session, whereas the neural maps 108 may change according to the shading latents 104. As such, the shading latents 104 may be transmitted or received more frequently than the identity textures 102. In one or more embodiments, a device may only obtain the identity textures 102 once per communication session or may refer to a same set of identity textures during one or more communication sessions with a user corresponding to the face. Meanwhile, the device may receive shading latents 104 throughout a communication session, such as every frame, and generate neural maps 108 accordingly. In one or more embodiments, the GPU shader 110 may indirectly use the neural maps 108 by warping the identity textures using the neural maps 108 to obtain a target texture.

Figure 2:
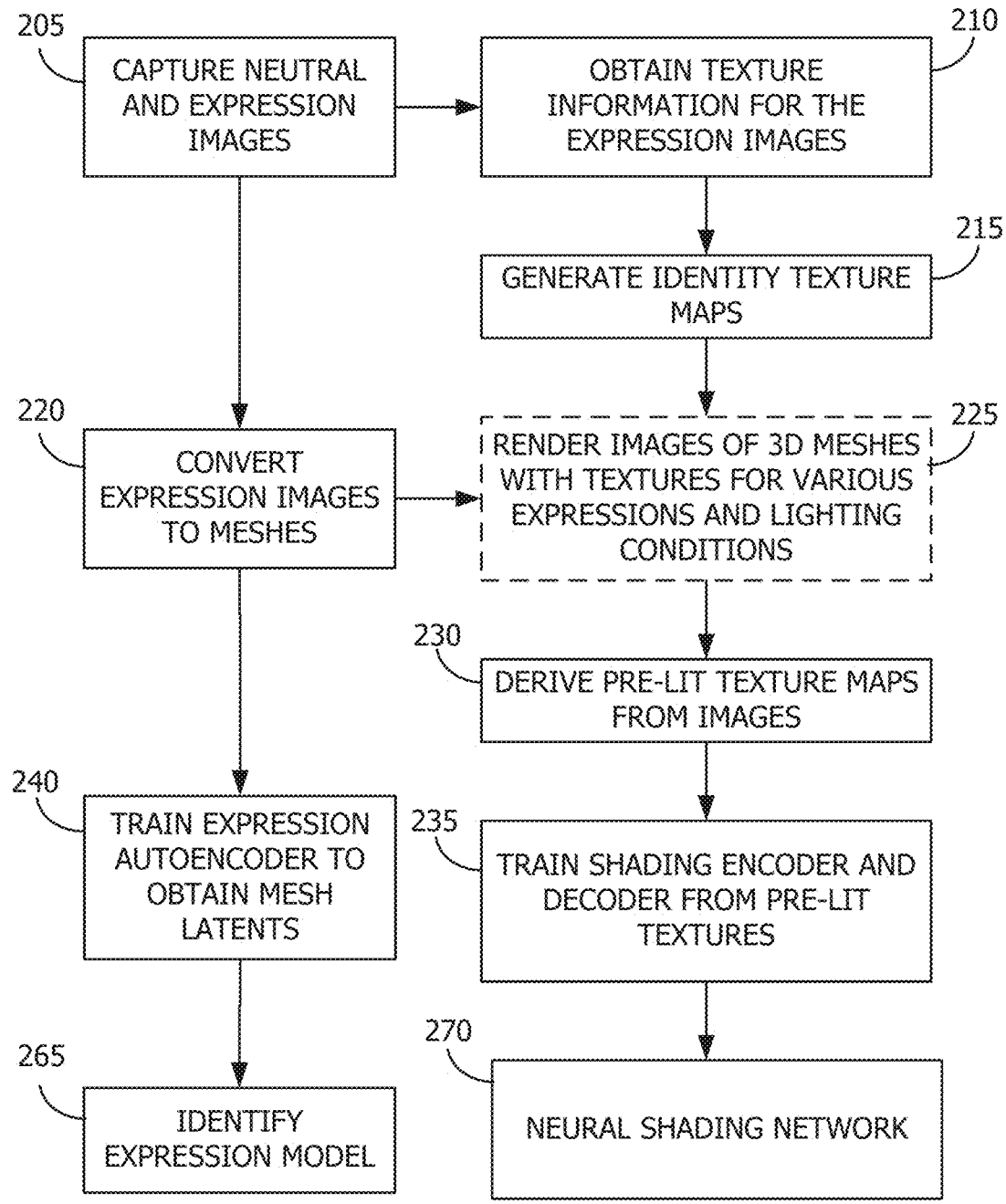
FIG. 2 shows a flowchart in which a neural shading network is generated, according to one or more embodiments.

Referring to FIG. 2, a flow diagram is illustrated in which mesh and shading encoders and decoders are trained from neutral and expressive images of faces. Although the various process depicted in FIG. 2 are illustrated in a particular order, it should be understood that the various processes described may be performed in a different order. Further, not all of the various processes may be necessary to be performed to train the mesh and texture encoders and decoders or obtain lighting representations.

According to one or more embodiments, the mesh and shading encoders and decoders may be trained from a series of images of one or more users in which the users are providing a particular expression or neutral image. As used here, the phrase "expression image" means an image of an individual having a non-neutral expression (e.g., happy, sad, excited, fearful, questioning, etc.). As such, the flowchart begins at 205, where a training module captures or otherwise obtains expression images. In one or more embodiments, the expression images may be captured as a series of frames, such as a video, or may be captured from still images or the like. The expression images may be acquired from numerous individuals or a single individual. For example, images may be obtained via a photogrammetry or stereophotogrammetry system, a laser scanner or an equivalent capture method. In one or more embodiments, the images may be captured with predetermined lighting.

The flowchart continues at 210 where the training module obtains texture information for the expression images and neutral images. The texture information may be obtained by extracting a lighting component from an albedo map for the subject. An offset for the lighting may be calculated from the albedo texture map for the facial expression. As such, a texture for the expression image is obtained in relation to the albedo map.

At 215, the training module generates identity texture maps for the faces, indicating the texture of the subject under uniform lighting from all directions. In one or more embodiments, the identity texture maps may include, for example, pseudo normals indicative of a texture of the face, a diffuse albedo map indicative of the diffuse reflectance of the face, and a specular albedo indicative of the specular reflectance of the face.

Returning to block 205, the neutral and expression images are captured, and the flowchart continues at 220, where the expression images are converted to 3D meshes. The 3D mesh represents a geometric representation of the geometry of the subject's face when the subject is performing the expression, according to one or more embodiments.

The flowchart continues at 225 where, optionally, the training module renders images of 3D meshes with textures for various expressions and lighting conditions. In one or more embodiments, the images may be rendered by a rendering software which may take the 3D meshes and textures and apply a lighting using point light sources, environment maps that indicate lighting in an environment, or the like, according to the created library of lighting conditions. Additionally, or alternatively, rendering the images may be performed in a multispectral lighting stage in which each light may have its own color and intensity which may be individually controlled and which may be included in the library of lighting conditions. For example, a controlled environment may be utilized in which the lighting on a subject is specifically controlled for intensity and direction and images may be captured of a subject being lit under the known lighting conditions. In some embodiments, the neutral and expression images captured at 205 may be captured under a variety of controlled lighting and, as such, step 225 is optional according to one or more embodiments.

The flowchart continues at block 230 where pre-lit texture maps are derived from the rendered images. That is, in contrast to the identity texture maps which indicate a texture of the subject under uniform lighting from all directions, the pre-lit texture maps indicate a texture of the subject under the particular lighting utilized in the rendering at block 225. As such, the texture map may be a 2D map that indicates a coloration offset from the albedo texture for the subject based on the particular lighting.

Then, at block 235, a shading encoder and shading decoder are trained from the identity texture maps and one or more pre-lit texture maps. The shading autoencoder may be trained with the pre-lit texture maps from block 230 in order to produce a latent representation of lighting characteristics from which neural maps may be produced. In doing so, shading latents may be obtained based on the training. The shading latents may be representative values from a shading latent vector which provides a compressed representation of the various parameters responsible for shading in vector form. The flowchart continues at block 270, where the neural shading network is provided, based on the shading encoder and shading decoder. In one or more embodiments, the shading encoder and shading decoder may be trained together, for example, as part of a shading autoencoder.

Returning to block 220, once 3D meshes are obtained from the expression images, the flowchart may also continue to block 240, where the 3D mesh representation may be used to train an expression mesh autoencoder neural network. The expression mesh autoencoder may be trained to reproduce a given expression mesh. As part of the training process of the expression mesh autoencoder, mesh latents may be obtained as a compact representation of a unique mesh. The mesh latents may refer to latent vector values representative of the particular user expression in the image. Particularly, the mesh latent vector is a code that describes to a decoder how to deform a mesh to fit a particular subject geometry for a given expression. In one or more embodiments, the image to expression mesh neural network may be trained so that given an image, a latent vector may be estimated. The flowchart continues at 265, where the training module identifies the expression model. According to one or more embodiments, the expression model may indicate a particular geometry of the user's face in an expressive state. Optionally, in or more embodiments, conditional variables may be applied to the expression model to further refine the model's output. Illustrative conditional variables include, for example, gender, age, body mass index, and emotional state. In one or more embodiments, the specific user's expression model may be stored for use during runtime.

Figure 3:
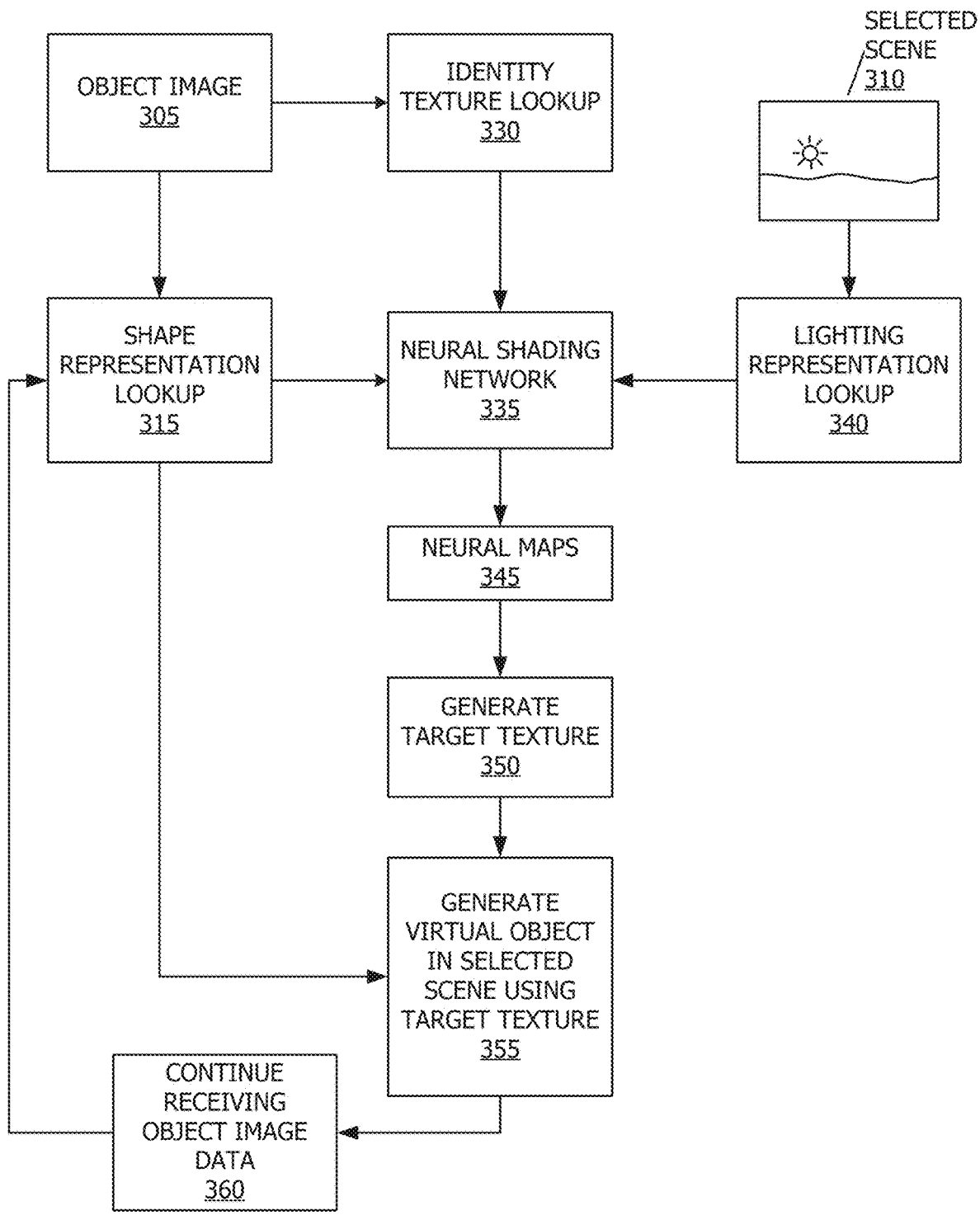
FIG. 3 shows an inference operation for a neural shading network, according to one or more embodiments.

Referring to FIG. 3, a flow chart is depicted in which a virtual object is rendered utilizing a neural shading network 335. According to one or more embodiments, the virtual object may be rendered by an avatar module of client device. The virtual object may be rendered on the fly and may be rendered, for example, as part of a gaming environment, a mixed reality application, and the like.

The flowchart begins at 305, in which an object pose to be represented by a virtual object is determined from an object image. Upon receiving the object image, the avatar module performs a shape representation lookup at 315. The shape representation lookup may be obtained from a known geometric representation of the shape in the case where the object is a rigid object, such as a 3D mesh.

At 330, the avatar module performs an identity texture lookup. The identity texture lookup may include requesting identity textures for a face in the object image 305. Additionally, or alternatively, the identity textures for a face may be obtained from local or remote storage, such as network storage.

In addition, at 310, a scene is selected, or determined to be selected, in which the virtual object is to be rendered. For example, the selected scene may be an environment different from an environment in which the object is currently present. In one or more embodiments, the selected scene may be selected by the user through a user interface in which the user may identify an environment in which the virtual object should be presented.

A lighting representation lookup 340 may be performed for the requested scene. The lighting representation may be represented in a variety of ways. In one or more embodiments, the lighting in the environment may be represented using spherical harmonics, spherical gaussians, spherical wavelets, and the like. According to one or more embodiments, the lighting representation may be obtained from a trained environment autoencoder which produces lighting latents in the process of reproducing a given environment map. The lighting representation may be obtained, for example, from an HDR environment map. The lighting representation may be represented in the form of a vector of RGB values that represent a current lighting in the environment.

The neural shading network 335 may then utilize the shape representation and lighting representation, among other optional parameters, to generate one or more neural maps 345. In one or more embodiments, the neural maps 345 may refer to a low-resolution flattened texture which may represent a texture of the object in object image 305 in the particular selected scene 310 based on the lighting within the scene 310. The flow chart continues at 350 where a target texture map is generated. According to one or more embodiments, the target texture map is generated by combining the identity textures with the neural maps.

The flowchart continues at block 355, where an avatar module renders the avatar utilizing the shape representation and the target texture. The avatar may be rendered in a number of ways. As an example, the target texture map may be rendered as an additional pass in a multipass rendering technique.

Because the avatar is generated in real time, it may be based on image data of the object or a dynamic environment. As such, the flowchart continues at 360 where the system continues to receive image data. Then the flowchart repeats at 305 while new image data is continuously received during a communication session.

Figure 4:
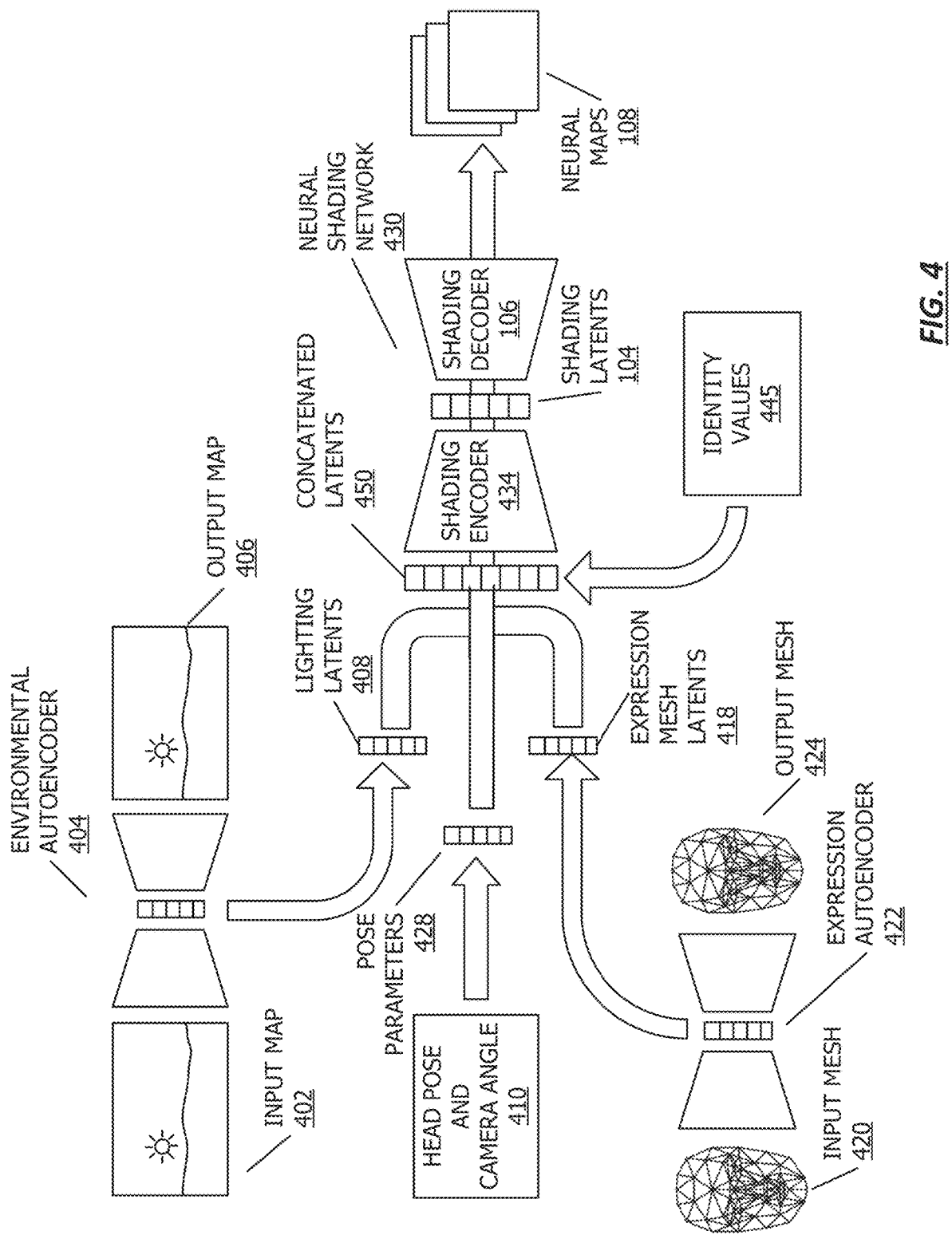
FIG. 4 shows, in flow diagram form, a technique for generating neural maps, according to one or more embodiments.

Referring to FIG. 4, a flowchart is depicted in which a neural shading network 430 is trained to provide a mapping between an expression of a user in an environment and a lighted texture for the user, according to one or more embodiments. The example flow is presented merely for description purposes. In one or more embodiments, not all components detailed may be necessary, and in one or more embodiments, additional or alternative components may be utilized.

The flow diagram begins when an environmental autoencoder 404 is trained to compress and recreate images of an environment. As such, environmental autoencoder 404 takes in input environment map 402 and recreates output environment map 406. One of the byproducts of the trained autoencoder is that the compressed version of the environment map 402 includes lighting latents 408 which include a set of values which represent the lighting of the input environment map 402. For example, the lighting latents 408 may represent brightness, color, and/or other characteristics related to lighting in a scene.

The flowchart also includes an expression autoencoder 422 which takes in an input mesh 420 representing facial expressions presented in one or a series of frames. In one or more embodiments, the facial expressions may be determined by obtaining latent variables associated with the facial geometry. As an example, an expression neural network model may be used which maps expressive image data to a 3D geometry of a representation of the expression. In one or more embodiments, the expression autoencoder 422 may be trained to recreate given input 3D meshes of expressions 420 to obtain output meshes 424. In one or more embodiments, the autoencoder "compresses" the variables in the 3D geometry to a smaller number of expression mesh latents 418 which may represent a geometric offset from a user's neutral face or otherwise represent a geometric representation of a face for a given expression.

According to one or more embodiments, the neural shading network 430 may be trained for a unique individual, or may be trained to handle multiple people. In the situation where the neural shading network 430 is trained to handle multiple people, identity values 445 may be obtained which uniquely identify a person for which the avatar is to be created. The identity values 445 may indicate a uniqueness of an individual, such as how a particular expression uniquely affects a texture of the face or other characteristics of the face.

The lighting latents 408, the pose parameters 428, the expression mesh latents 418 and, optionally, the identity values 445 may be combined to form concatenated latents 450 which may be used as input values to the shading encoder 434. In one or more embodiments, the various inputs may be weighted or calibrated against each other. The combined values may be normalized in order to prevent over-representation or under-representation of the various values. In one or more embodiments, batch normalization may be utilized to adjust or condense the various values of input values 450.

The neural shading network 430 may include a shading encoder 434 appended to a shading decoder 106 which is trained to read in the input values 450 and generate one or more neural maps 108, as described above with respect to FIG. 1. In some embodiments, the shading encoder 434 and the shading decoder 106 may be trained together, for example as part of a shading autoencoder. Alternatively, the shading encoder 434 and shading decoder 106 may be separately trained. In some embodiments, the shading encoder 434 may be trained to take in concatenated latents 450 and produce shading latents 104, which can be used by shading decoder 106 to produce neural maps 108. According to one or more embodiments, the neural maps 108 include low-resolution lighting-related maps which may be used in conjunction with identity textures to generate a target texture. The neural maps 108 may include, for example, a displacement map, an ambient map, a diffuse map, a specular map, a shadow map, and the like.

Figure 5:
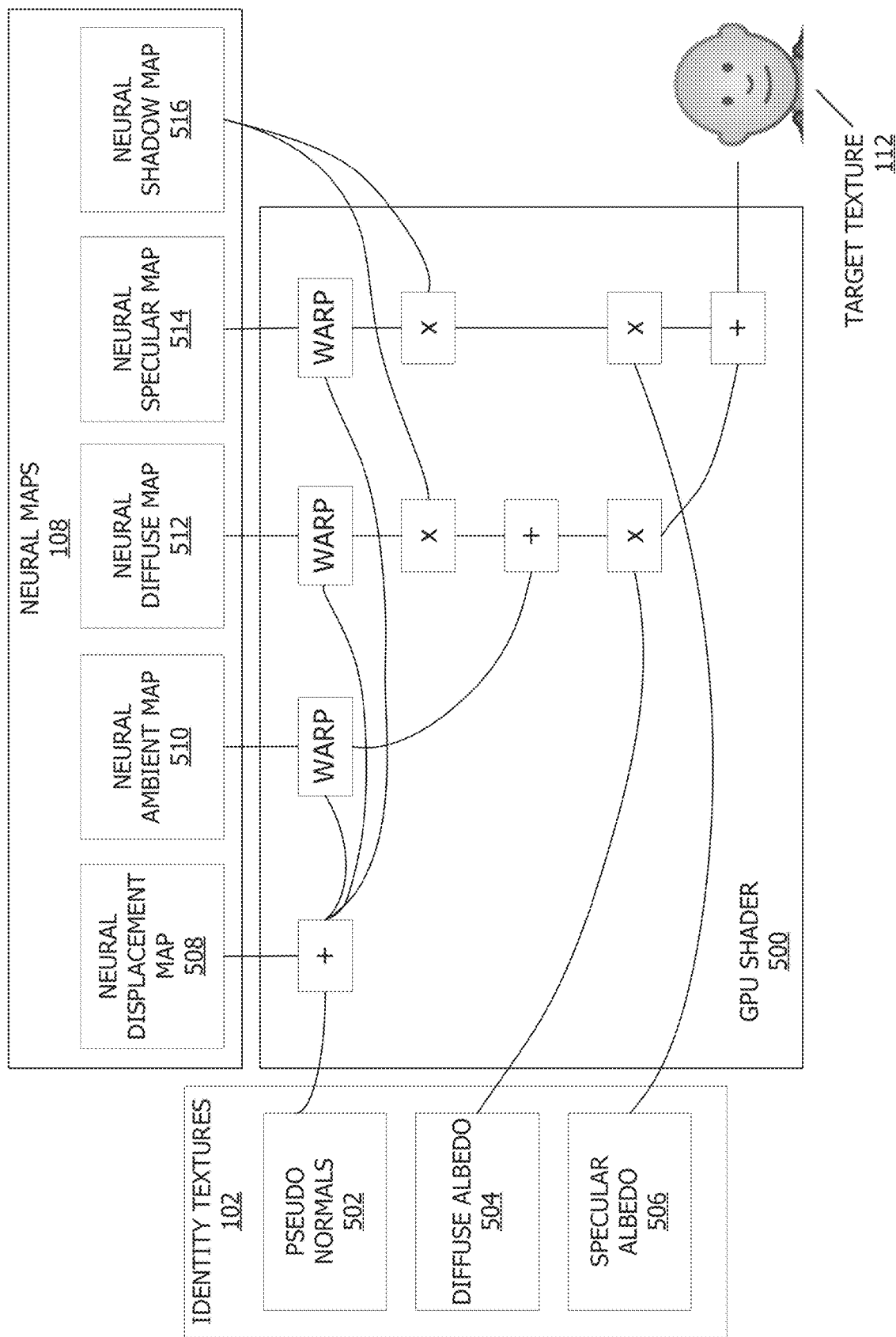
FIG. 5 shows, in flow diagram form, a technique for generating a target texture, in accordance with one or more embodiments.

FIG. 5 shows, in flow diagram form, a technique for generating a target texture, in accordance with one or more embodiments. In particular, FIG. 5 shows an example embodiment in which a GPU shader 500 uses neural maps 108 to warp identity textures 102 to obtain a target texture 112.

The flow diagram begins by combining the neural displacement map 508 with the pseudo normals 502, which are representative of the unique texture of a person's face. A neural ambient map 510 is then warped by the combination. The warped ambient map may also modify, such as multiply, the diffuse albedo texture to obtain an ambient result. In one or more embodiments, the pseudo-normal map and displacement map both have two channels, one channel representing horizontal pixel displacements and one representing vertical pixel displacements, which produce the warp. The neural diffuse map 512 and the neural specular map may also be warped by the combination. The warped neural diffuse map 512 may be modified, or multiplied, in accordance with the neural shadow map 516, which may in turn be used to modify, or multiply, the diffuse albedo texture 504. Similarly, the warped neural specular map 514 may be modified, or multiplied, in accordance with the neural shadow map 516, which may in turn be used to modify, or multiply, the specular albedo texture 506. The GPU shader 500 may combine the results (e.g., the ambient result, the diffuse result, and the specular result) to obtain target texture 112. According to one or more embodiments, the neural shadow map 516 may have two channels, one for diffuse and one for specular application.

Figure 6:
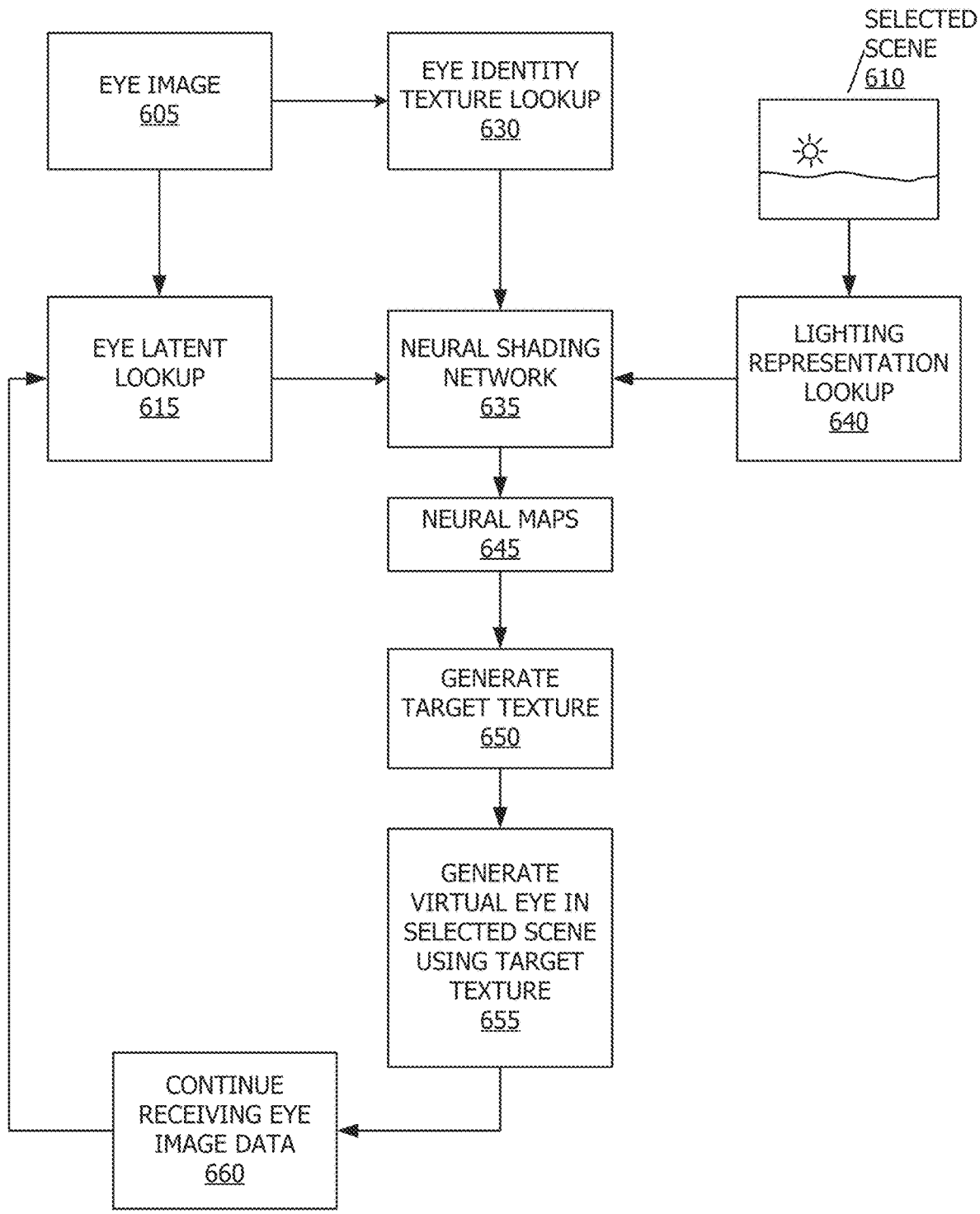
FIG. 6 shows a flow diagram illustrating generation of a virtual eye, in accordance with one or more additional embodiments.

FIG. 6 shows a flow diagram illustrating generation of a virtual eye, in accordance with one or more additional embodiments. In one or more embodiments, eyes of an avatar may be produced in a similar manner to that described above. However, because of unique characteristics of human eyes, some considerations may differ.

The flowchart begins at 605, in which an eye image is captured. The eye image may be the same image as that captured of a user's face, as in 305 of FIG. 3, or may be an additional image, for example, from a camera directed at the eyes of a user. Upon receiving the eye image, an avatar module performs an eye identity lookup at 630. The eye identity lookup may include identifying one or more identity textures for the eye. In one or more embodiments, the eye identity textures may include a pseudo norm texture and a diffuse texture. The identity texture lookup may include requesting identity textures for the eye. Additionally, or alternatively, the identity textures for the eye may be obtained from local or remote storage, such as network storage.

From the eye image 605, a latent lookup may be performed with respect to the eye at 615. The latent representation may include parameters such as eye shape and/or other characteristics particular to the eye. In addition, at 610, a scene is selected, or determined to be selected, in which the avatar is to be rendered. For example, the selected scene may be an environment different from an environment in which the object is currently present. In one or more embodiments, the selected scene may be selected by the user through a user interface in which the user may identify an environment in which the virtual object should be presented.

A lighting representation lookup 640 may be performed for the requested scene. The lighting representation may be represented in a variety of ways. In one or more embodiments, the lighting in the environment may be represented using spherical harmonics, spherical gaussians, spherical wavelets, and the like. According to one or more embodiments, the lighting representation may be obtained from a trained environment autoencoder which produces lighting latents in the process of reproducing a given environment map. The lighting representation may be obtained, for example, from an HDR environment map. The lighting representation may be represented in the form of a vector of RGB values that represent a current lighting in the environment.

The neural shading network 635 may then utilize the eye latent representation and lighting representation, among other optional parameters, to generate one or more eye neural maps 645. In one or more embodiments, the neural maps 645 may refer to a low-resolution flattened texture which may represent a texture of the eye in image 605 in the particular selected scene 610 based on the lighting within the scene. In one or more embodiments, the neural shading network 635 may be trained to generate one or more eye neural maps 645. The eye neural maps 645 may be related to a reflection and/or a refraction of the eye.

The flow chart continues at 650, where a target texture map is generated. According to one or more embodiments, the target texture map is generated by combining the identity textures from 630 with the neural maps from 645. More specifically, in one or more embodiments, a GPU shader warps the identity textures in accordance with the neural maps to generate the target texture.

The flowchart continues at block 655, where an eye for an avatar is rendered using the target texture. The avatar may be rendered in a number of ways. For example, the target texture map may be rendered as an additional pass in a multipass rendering technique. The target texture may be combined, for example, with the target texture from FIG. 3 to generate a realistic avatar both for the skin and the eye of the user.

Because the avatar is generated in real time, it may be based on image data of the object or a dynamic environment. As such, the flowchart continues at 660 where the system continues to receive image data. Then the flowchart repeats at 605 while new eye image data is continuously received during a communication session.

Figure 7:
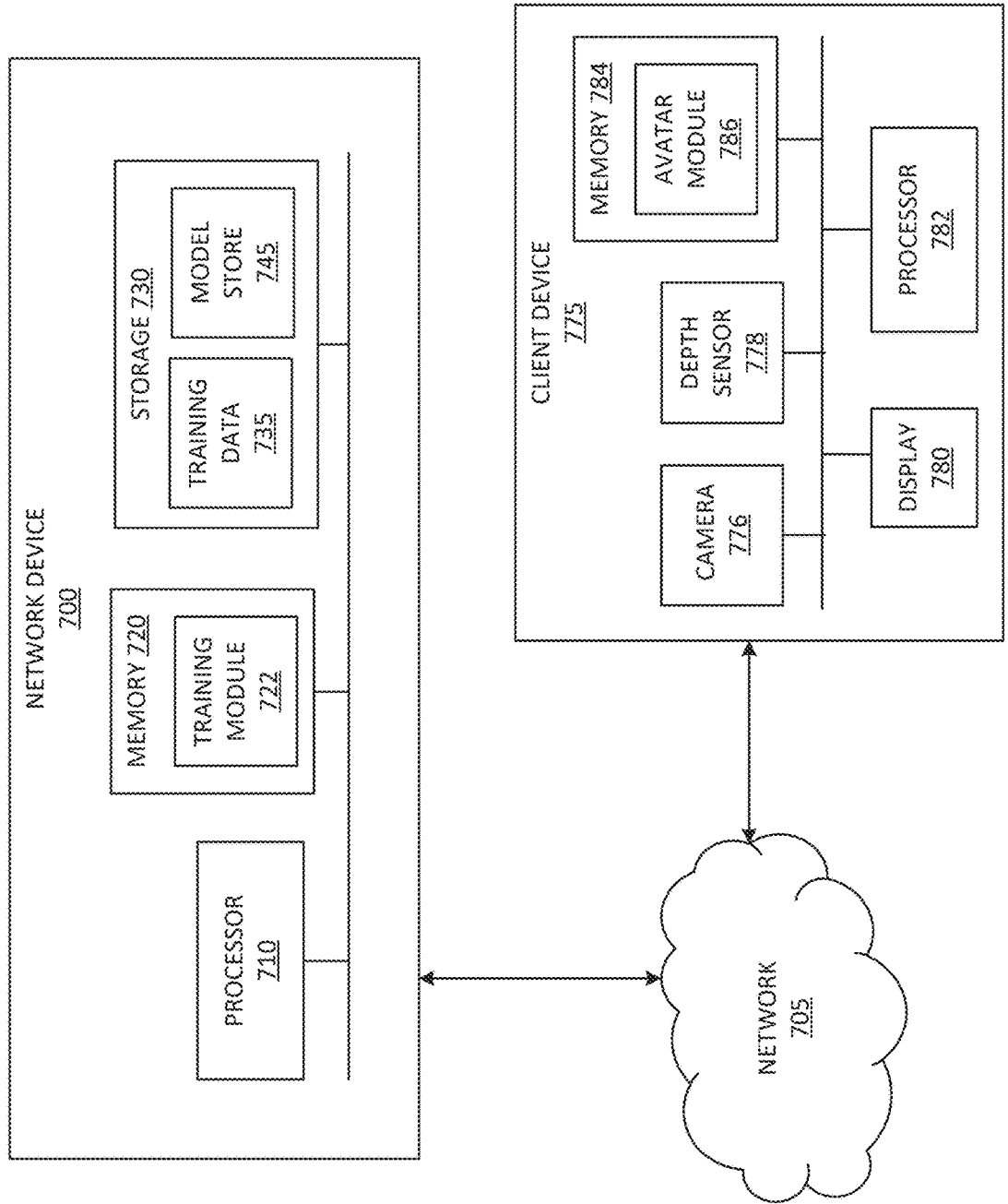
FIG. 7 shows, in block diagram form, a multifunction electronic device, in accordance with one or more embodiments.

Referring to FIG. 7, a simplified block diagram of a network device 700 is depicted, communicably connected to a client device 775, in accordance with one or more embodiments of the disclosure. Client device 775 may be part of a multifunctional device, such as a mobile phone, tablet computer, personal digital assistant, portable music/video player, wearable device, base station, laptop computer, desktop computer, network device, or any other electronic device. Network device 700 may represent one or more server devices or other network computing devices within which the various functionality may be contained or across which the various functionality may be distributed. Network device 700 may be connected to the client device 775 across a network 705. Illustrative networks include, but are not limited to, a local network such as a universal serial bus (USB) network, an organization's local area network, and a wide area network such as the Internet. According to one or more embodiments, network device 700 is utilized to train a model using training data 735 such as images of faces under various lighting to generate a neural shading network, for example, by training module 722. Further, network device 700 may utilize the trained neural shading network to generate a texture for an avatar that depicts the texture of the avatar in the lighting of a selected environment. The trained network may be stored, for example, in model store 745. Client device 775 is generally used to generate and/or present an avatar which is rendered in part based on the environmental lighting of a selected environment. It should be understood that the various components and functionality within network device 700 and client device 775 may be differently distributed across the devices or may be distributed across additional devices.

Network device 700 may include a processor, such as a central processing unit (CPU), 710. Processor 710 may be a system-on-chip such as those found in mobile devices and include one or more dedicated graphics processing units (GPUs). Further, processor 710 may include multiple processors of the same or different type. Network device 700 may also include a memory 720. Memory 720 may include one or more different types of memory, which may be used for performing device functions in conjunction with processor 710. For example, memory 720 may include cache, ROM, RAM, or any kind of transitory or non-transitory computer-readable storage medium capable of storing computer-readable code. Memory 720 may store various programming modules for execution by processor 710, including training module 722. Network device 700 may also include storage 730. Storage 730 may include one more non-transitory computer-readable mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 730 may include training data 735 and model store 745.

Client device 775 may be electronic devices with components similar to those described above with respect to network device 700. Client device 775 may include, for example, a memory 784 and processor 782. Client device 775 may also include one or more cameras 776 or other sensors, such as depth sensor 778, from which depth of a scene may be determined. In one or more embodiments, each of the one or more cameras 776 may be a traditional RGB camera or a depth camera. Further, cameras 776 may include a stereo- or other multi-camera system, a time-of-flight camera system, or the like which capture images from which depth information of a scene may be determined. Client device 775 may allow a user to interact with extended reality (XR) environments. There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display device 780 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Although network device 700 is depicted as comprising the numerous components described above, in one or more embodiments, the various components may be distributed across multiple devices. Particularly, in one or more embodiments, one or more of the training module 722 and avatar module 786 may be distributed differently across the network device 700 and the client device 775, or the functionality of either of the training module 722 and avatar module 786 may be distributed across multiple modules, components, or devices, such as network devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 8:
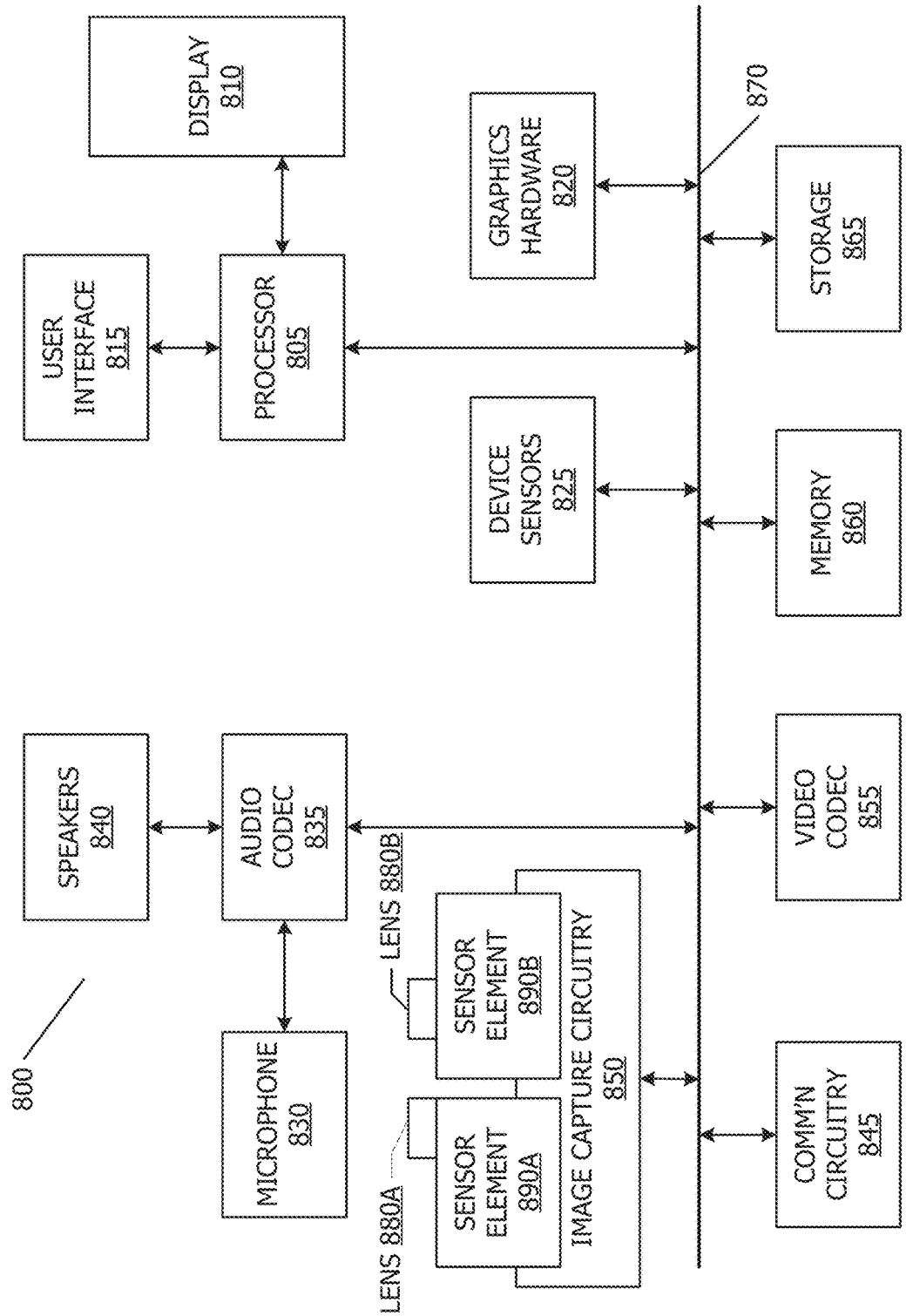
FIG. 8 shows, in block diagram form, a computer system, in accordance with one or more embodiments.

Referring now to FIG. 8, a simplified functional block diagram of illustrative multifunction electronic device 800 is shown, according to one embodiment. Each of electronic devices may be a multifunctional electronic device or may have some or all of the described components of a multifunctional electronic device described herein. Multifunction electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture circuitry 850 (e.g., including camera system), video codec(s) 855 (e.g., in support of digital image capture unit), memory 860, storage device 865, and communications bus 870. Multifunction electronic device 800 may be, for example, a digital camera or a personal electronic device such as a personal digital assistant (PDA), personal music player, mobile telephone, or a tablet computer.

Processor 805 may execute instructions necessary to carry out or control the operation of many functions performed by device 800 (e.g., such as the generation and/or processing of images as disclosed herein). Processor 805 may, for instance, drive display 810 and receive user input from user interface 815. User interface 815 may allow a user to interact with device 800. For example, user interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include two (or more) lens assemblies 880A and 880B, where each lens assembly may have a separate focal length. For example, lens assembly 880A may have a short focal length relative to the focal length of lens assembly 880B. Each lens assembly may have a separate associated sensor element 890. Alternatively, two or more lens assemblies may share a common sensor element. Image capture circuitry 850 may capture still and/or video images. Output from image capture circuitry 850 may be processed, at least in part, by video codec(s) 855 and/or processor 805 and/or graphics hardware 820, and/or a dedicated image processing unit or pipeline incorporated within image capture circuitry 850. Images so captured may be stored in memory 860 and/or storage 865.

Image capture circuitry 850 may capture still and video images that may be processed in accordance with this disclosure, at least in part, by video codec(s) 855 and/or processor 805 and/or graphics hardware 820, and/or a dedicated image processing unit incorporated within image capture circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory computer-readable storage mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805, such computer program code may implement one or more of the methods described herein.

The present disclosure recognizes that the use of such personal information data, in the present technology, can be used to the benefit of users. For example, the personal information data can be used to train expression models. Accordingly, use of such personal information data enables users to estimate emotion from an image of a face. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA), whereas health data in other countries may be subject to other regulations and policies and should be handled accordingly. Hence, different privacy practices should be maintained for different personal data types in each country.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions or the arrangement of elements shown should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer-readable medium comprising computer-readable code executable by one or more processors to:
   initiate an image-based communication session between a local device and a remote device;
   obtain one or more identity textures for a user, wherein the one or more identity textures are generated prior to the image-based communication session; and
   for each of one or more frames of the communication session:
   receive, from the remote device, shading latents, wherein the shading latents comprise an encoded set of concatenated latents comprising mesh values, lighting values, and identity values for the user,
   apply the shading latents to a decoder to obtain one or more neural maps, and
   generate a target texture by warping the one or more identity textures in accordance with the one or more neural maps for a particular frame of the one or more frames.

2. The non-transitory computer-readable medium of claim 1, further comprising computer readable code to:
   render an avatar representative of the user based on the target texture.

3. The non-transitory computer-readable medium of claim 1, wherein the one or more identity textures comprises at least one selected from a group consisting of a pseudo norm texture, a diffuse albedo texture, and a specular albedo texture.

4. The non-transitory computer-readable medium of claim 3, wherein the one or more neural maps comprises at least one selected from a group consisting of a neural displacement map, an ambient map, a diffuse map, and a specular map.

5. The non-transitory computer-readable medium of claim 4, wherein the one or more neural maps further comprises a shadow map, and wherein the shadow map is configured to indicate placement of one or more of diffuse and specular according to one or more of the diffuse map and the specular map.

6. The non-transitory computer-readable medium of claim 1, further comprising computer readable code to:
   obtain one or more eye identity textures comprising at least one selected from a group consisting of a pseudo norm texture and a diffuse texture; and
   for each of the one or more frames of the communications session:

obtaining one or more eye shading latents, and
apply the eye shading latents to an additional decoder to obtain one or more eye neural maps, and
generate a target eye texture by warping the one or more eye identity textures in accordance with the one or more eye neural maps.

7. The non-transitory computer-readable medium of claim 6, wherein the eye neural maps are representative of refraction and reflection on one or more eyes.

8. A system, comprising:
one or more processors; and
one or more computer-readable media comprising computer-readable code executable by the one or more processors to:
initiate an image-based communication session between a local device and a remote device;
obtain one or more identity textures for a user, wherein the one or more identity textures are generated prior to the image-based communication session; and
for each of one or more frames of the communication session:
receive, from the remote device, shading latents, wherein the shading latents comprise an encoded set of concatenated latents comprising mesh values, lighting values, and identity values for the user,
apply the shading latents to a decoder to obtain one or more neural maps, and
generate a target texture by warping the one or more identity textures in accordance with the one or more neural maps for a particular frame of the one or more frames.

9. The system of claim 8, further comprising computer-readable code to:
render an avatar representative of the user based on the target texture.

10. The system of claim 8, wherein the one or more identity textures comprises at least one selected from a group consisting of a pseudo norm texture, a diffuse albedo texture, and a specular albedo texture.

11. The system of claim 8, wherein the one or more neural maps comprises at least one selected from a group consisting of a neural displacement map, an ambient map, a diffuse map, and a specular map.

12. The system of claim 11, wherein the one or more neural maps further comprises a shadow map, and wherein the shadow map is configured to indicate placement of one or more of diffuse and specular according to one or more of the diffuse map and the specular map.

13. The system of claim 8, wherein the shading latents are derived from shading parameters comprised of lighting latents, pose latents, and expression mesh latents.

14. The system of claim 8, further comprising computer readable code to:
obtain one or more eye identity textures comprising at least one selected from a group consisting of a pseudo norm texture and a diffuse texture; and
for each of the one or more frames of the communications session:
obtaining one or more eye shading latents, and
apply the eye shading latents to an additional decoder to obtain one or more eye neural maps, and
generate a target eye texture by warping the one or more eye identity textures in accordance with the one or more eye neural maps.

15. A method comprising:
initiating an image-based communication session between a local device and a remoting device;
obtaining one or more identity textures for a user, wherein the one or more identity textures are generated prior to the image-based communication session; and
for each of one or more frames of the communication session:
receiving, from the remote device, shading latents, wherein the shading latents comprise an encoded set of concatenated latents comprising mesh values, lighting values, and identity values for the user,
applying the shading latents to a decoder to obtain one or more neural maps, and
generating a target texture by warping the one or more identity textures in accordance with the one or more neural maps for a particular frame of the one or more frames.

16. The method of claim 15, further comprising:
rendering an avatar representative of the user based on the target texture.

17. The method of claim 15, wherein the one or more identity textures comprises at least one selected from a group consisting of a pseudo norm texture, a diffuse albedo texture, and a specular albedo texture.

18. The method of claim 15, wherein the one or more neural maps comprises at least one selected from a group consisting of a neural displacement map, an ambient map, a diffuse map, and a specular map.

19. The method of claim 18, wherein the one or more neural maps further comprises a shadow map, and wherein the shadow map is configured to indicate placement of one or more of diffuse and specular according to one or more of the diffuse map and the specular map.

20. The method of claim 15, wherein the shading latents are derived from shading parameters comprised of lighting latents, pose latents, and expression mesh latents.

* * * * *